United States Patent [19]

Thompson

[11] Patent Number: 5,893,984
[45] Date of Patent: Apr. 13, 1999

[54] HIGH ASPECT RATIO EDM ELECTRODE ASSEMBLY

[75] Inventor: Robert Alan Thompson, Quaker Street, N.Y.

[73] Assignee: General Electric Company, Schenectady, N.Y.

[21] Appl. No.: 08/549,614

[22] Filed: Oct. 27, 1995

[51] Int. Cl.$^6$ ............................ B23H 1/00; B23H 9/10
[52] U.S. Cl. ........................ 219/69.15; 219/69.17
[58] Field of Search .................... 219/69.15, 69.17, 219/69.14; 205/653, 655; 204/224 M

[56] References Cited

U.S. PATENT DOCUMENTS

| | | | |
|---|---|---|---|
| 3,058,895 | 10/1962 | Williams | 205/653 |
| 3,214,361 | 10/1965 | Williams | 204/224 M |
| 3,257,300 | 6/1966 | Williams | 205/653 |
| 3,271,281 | 9/1966 | Brown et al. | 205/653 |
| 3,403,085 | 9/1968 | Berger et al. | 205/653 |
| 3,467,807 | 9/1969 | Livshits et al. | 219/69.15 |
| 4,441,004 | 4/1984 | Inoue | 219/69.15 |
| 4,684,323 | 8/1987 | Field | 416/97 R |
| 4,995,949 | 2/1991 | Rhoades | 219/69.17 |
| 5,605,639 | 2/1997 | Banks et al. | 219/69.15 |
| 5,618,450 | 4/1997 | Stuart et al. | 219/69.15 |

OTHER PUBLICATIONS

"Electrical Discharge Machining, A Basic Overview of EDM", by Guitrau, E&M Engineering, Copyright 1990 and 1991, pp.: Table of Contents, 1.1–3.13.

*Primary Examiner*—Geoffrey S. Evans
*Attorney, Agent, or Firm*—Tyler Maddry; Marvin Snyder

[57] ABSTRACT

An electrode assembly for electrical discharge machining (EDM) a slot in a wall includes a plurality of laterally abutting individual electrodes having a collective perimeter configuration complementary with the slot. The electrodes define a collective height equal to the sum of their individual heights which may be substantially greater than the individual widths thereof for machining a correspondingly high aspect ratio slot in the wall.

17 Claims, 2 Drawing Sheets

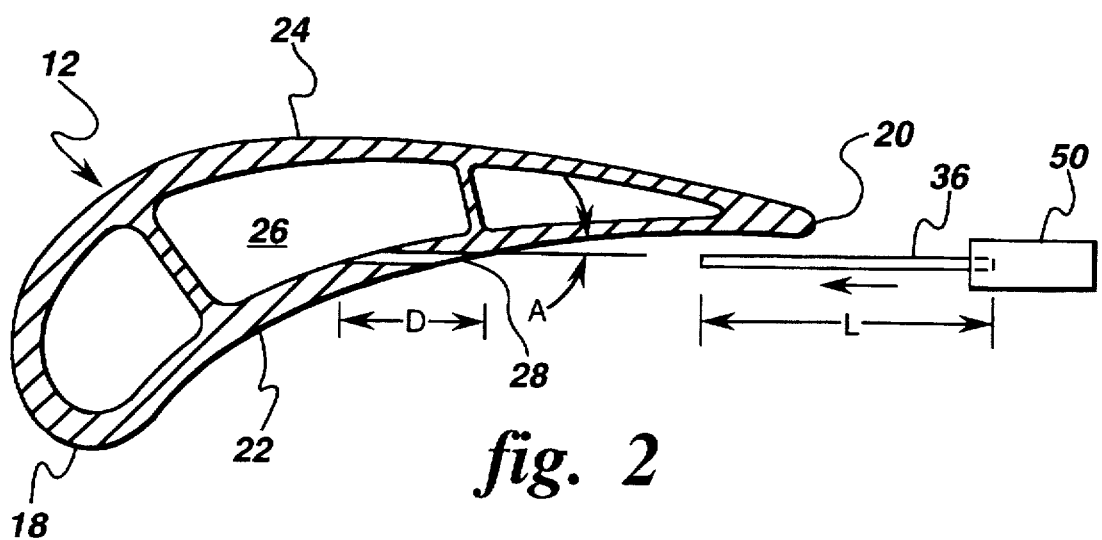
fig. 2
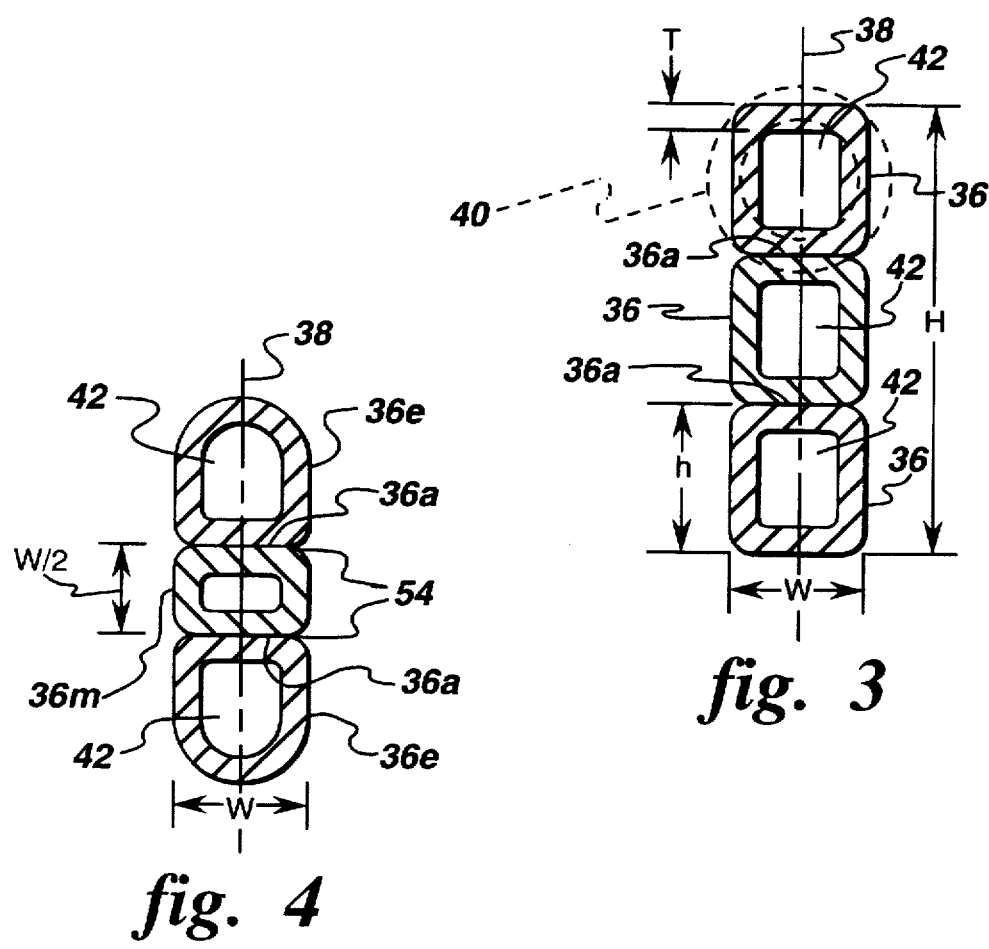
fig. 3
fig. 4

HIGH ASPECT RATIO EDM ELECTRODE ASSEMBLY

BACKGROUND OF THE INVENTION

The present invention relates generally to electrical discharge machining (EDM), and, more specifically, to an improved electrode for forming high aspect ratio holes.

Electrical discharge machining is a common process for forming holes of various shapes and configurations in a metal workpiece. An electrode having the desired shape is advanced toward the workpiece, with a suitable DC power supply effecting an anode and cathode between the workpiece and electrode for forming a controlled spark which melts and vaporizes the workpiece material to form the desired hole. An insulating liquid or dielectric fluid, such as a suitable oil or de-ionized water, provides insulation against premature spark discharge, cools the machined area, and flushes away the removed material.

EDM is commonly used for forming cooling air holes or slots in gas turbine airfoils to provide film cooling thereof during operation. Large turbine airfoils are used in an exemplary land based gas turbine engine sized and configured for power generation, such as driving an electrical generator in a utility grid. Pressurized air from a compressor is mixed with fuel and ignited in a combustor for generating hot combustion gases which flow downstream to a turbine which powers the compressor as well as produces output power. A typical turbine stage includes a row of nozzle vanes and a corresponding row of rotor blades mounted to the perimeter of a rotor disk. The vanes and blades have suitably configured airfoils over which the hot combustion gases flow for extracting energy therefrom. The vanes and blades are therefore typically cooled using a portion of the pressurized air bled from the compressor which is channeled through the respective airfoils and out various holes formed through the walls thereof.

Vane and blade airfoils conventionally include leading and trailing edges extending from root to tip, with opposite concave and convex sides forming respective pressure and suction surfaces. The inside of the airfoil is hollow and is suitably provided with the pressurized cooling air which is discharged through various types of film cooling holes extending through either or both of the pressure and suction sidewalls. In one typical embodiment, the film cooling holes are inclined at a small acute angle of about 15° to the surface of the sidewall and each extends through a considerable axial length of the sidewall for defining an inlet inside the airfoil and an outlet on the outside surface. The cooling air is channeled from the inside of the airfoil, out the film cooling holes, and develops a boundary layer of film cooling air for protecting the airfoil from the hot environment created by the combustion gases.

Typical film cooling holes are usually round in cross section and may be formed by conventional EDM or laser drilling for example. Non-circular film cooling holes, such as rectangular holes, have been developed for improving film cooling effectiveness. Rectangular holes or slots have a section aspect ratio defined by the longest side or height divided by the shortest side or width which is preferably greater than 1.0. The holes also have a depth aspect ratio defined by the length or depth of the hole through the airfoil sidewall divided by the width, which is typically larger than the section aspect ratio. In the large turbine airfoils found in a power generation gas turbine engine, the depth aspect ratio can be on the order of about 50, for example with a two inch length and a 40 mil width.

Accordingly, the large section and depth aspect ratios of an exemplary rectangular film cooling hole or slot at the small inclination angle of about 15° substantially increases the complexity of forming such holes during the manufacturing of the vane or blade airfoils.

For example, conventional EDM employs either solid or flush-through hollow electrodes for producing holes in a workpiece wall such as a turbine airfoil. The solid electrode may be formed with the required shape, and the dielectric fluid is suitably channeled between the electrode and the hole being formed thereby. In the flushing electrode, a center passage is provided through the electrode for conventionally providing the dielectric fluid through the electrode so that deeper or higher depth aspect ratio holes may be formed. The solid electrodes are limited in machining depths by their ability to effectively remove material debris during the machining process, with flushing electrodes being used for machining greater hole depths since they more effectively flush the dielectric fluid.

Since EDM electrodes are consumed during operation, the turnaround time for manufacturing electrodes and the cost thereof are significant factors in the electrode design. In order to inexpensively produce flushing electrodes, circular tubes are typically plastically flattened into a generally rectangular or square configuration for forming corresponding rectangular or square EDM holes in the workpiece. However, there are practical limits in providing these flattened flushing electrodes with relatively large section aspect ratios. If the aspect ratio is too large, the walls of the tube during the manufacturing process will collapse into a dogbone shape and lose the rectangular shape desired.

Furthermore, at relatively large section aspect ratios, the long sides of the rectangular become more resilient which can destabilize the EDM process due to dynamic vibratory excitation of the long walls, which in turn can cause undesirable hole shape or oversizing thereof. Electrode deflection at the shallow entry angles, of about 15° for example, can also occur which decreases the accuracy of the hole location along the minor axis of the rectangle, as well as causing inefficient and slow EDM cutting action.

The wall thickness of the tubular electrode must be suitably large for both accommodating inherent wear of the electrode during the EDM process as well as providing suitable structural stiffness of the electrode. The required center passage in the flushing electrode provides a practical limit on the minimum dimension of the electrode. In view of these exemplary considerations, a conventional, rectangular flushing electrode has an upper section aspect ratio of about 1.6 for forming a rectangular hole of about 80 by 50 mils for example. Since higher section aspect ratios substantially greater than this presently attainable ratio are desired for improving film cooling slot performance, an improved EDM electrode is desired.

SUMMARY OF THE INVENTION

An electrode assembly for electrical discharge machining (EDM) a slot in a wall includes a plurality of laterally abutting individual electrodes having a collective perimeter configuration complementary with the slot. The electrodes define a collective height equal to the sum of their individual heights which may be substantially greater than the individual widths thereof for machining a correspondingly high aspect ratio slot in the wall.

BRIEF DESCRIPTION OF THE DRAWINGS

The invention, in accordance with preferred and exemplary embodiments, together with further objects and advan-

Figure 1:
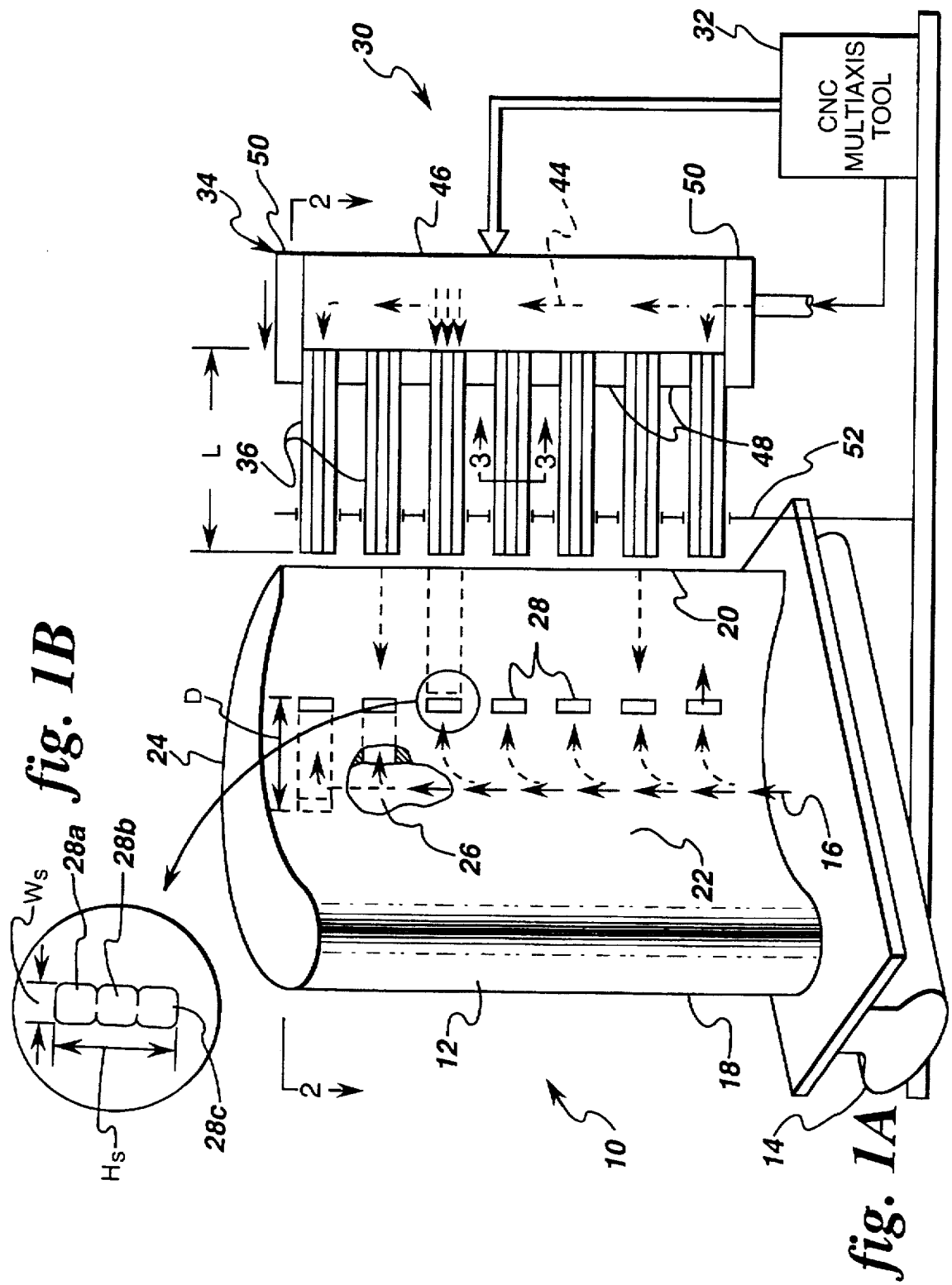

3 tages thereof, is more particularly described in the following detailed description taken in conjunction with the accompanying drawings in which:

FIG. 1A is a schematic representation of an electrode assembly for electrical discharge machining a slot in a wall of a gas turbine engine airfoil in accordance with an exemplary embodiment of the present invention.

FIG. 1B is an enlarged view of one of the machined slots shown in FIG. 1A.

FIG. 2 is a radial sectional view through a portion of the airfoil and EDM electrode assembly illustrated in FIG. 1 and taken generally along line 2—2.

FIG. 3 is a lateral sectional view through a portion of the electrode assembly illustrated in FIG. 1 in accordance with an exemplary embodiment of the present invention and taken along line 3—3.

FIG. 4 is a sectional view similar to FIG. 3 illustrating the electrode assembly in accordance with a second embodiment of the present invention.

DESCRIPTION OF THE PREFERRED EMBODIMENT(S)

Illustrated schematically in FIG. 1, which includes FIG. 1A and blow-up FIG. 1B, is a workpiece 10 in the exemplary form of a turbine rotor blade of a land based power generation gas turbine engine. The workpiece 10 may take any suitable form, including also a turbine nozzle vane for example, with the blade or vane having a conventionally configured airfoil 12 over which hot combustion gases of the engine flow during operation. For the exemplary rotor blade illustrated in FIG. 1, the airfoil 12 is initially formed with a conventional dovetail 14 which is used for fixedly mounting the rotor blade to a corresponding rotor disk (not shown) which rotates during operation of the engine.

In order to cool the airfoil 12 during engine operation, cooling air 16 is conventionally bled from a compressor of the engine (not shown) and channeled to the inside of the airfoil 12. The airfoil 12 includes a leading edge 18, a trailing edge 20 spaced axially therefrom, and a generally concave first sidewall 22 and a generally convex second sidewall 24 extending axially therebetween from the root to the tip of the airfoil. The airfoil 12 itself may take any suitable configuration and is hollow to define one or more cooling passages 26 through which the cooling air 16 is channeled during engine operation.

As shown in FIGS. 1 and 2, the airfoil 12 includes a plurality of radially aligned and spaced apart film cooling holes or slots 28 formed through the first sidewall 22 for example using electrical discharge machining (EDM) in accordance with an exemplary embodiment of the present invention. Although a single vertical row of the cooling holes 28 are illustrated in FIG. 1, similar holes may be positioned at any location of the airfoil 12 as desired in accordance with conventional practice, with machining of the holes 28 being the subject of the present invention.

More specifically, each of the cooling holes 28 is in the form of a through-slot extending axially through the first sidewall 22 at a suitable inclination angle A as shown in more detail in FIG. 2, with the inclination angle A taking any suitable value such as 15°. As shown in FIG. 1, each slot 28 has a generally rectangular sectional configuration with a height $H_S$ being greater than a width $W_S$. The slot 28 extends completely through the first sidewall 22 at the acute inclination angle A for a total length or depth D, which is substantially greater than the width $W_S$ of the slot 28. For example, the slot 28 may have a height of about 100 mils, a width of about 40 mils, and a length or depth of about 2 inches. Accordingly, the slot 28 has a depth aspect ratio of its depth D divided by its width $W_S$ of about 50.

In accordance with the present invention, each of the high depth aspect ratio slots 28 is formed using an electrical discharge machining (EDM) tool 30 specifically configured therefor. The EDM tool 30 includes a conventional multi-axis machine 32 such as a computer numerical control (CNC) 6-axis machine from which the workpiece 10 may be conventionally fixedly supported using a suitable fixture, and also from which an electrode tool 34 may be mounted for multi-axis translation and rotation as desired for advancing the electrode tool 34 into the workpiece airfoil 12 for simultaneously forming the several slots 28.

In the exemplary embodiment illustrated in FIG. 1, the electrode tool 34 includes vertically spaced apart electrode fingers corresponding to each of the slots 28 being formed, with the fingers being identical to each other and each including a plurality of laterally abutting individual EDM cutting electrodes 36 as shown in FIGS. 1 and 3, which have a collective perimeter configuration complementary with the shape or section of the slot 28 being formed thereby by electrical discharge machining. The slot 28 is preferably rectangular for enhanced cooling-air effectiveness, and correspondingly the collective configuration of the abutting electrodes 36 is also rectangular. Since the desired lateral aspect ratio of the slot 28 is substantially greater than 1.0, about 2.5 for example, a conventional single EDM electrode may not be practically used for machining the slot 28.

As indicated above, a conventional single rectangular EDM electrode has a practical limit in section aspect ratio of about 1.6 for both effectively forming the electrodes themselves, and for forming the slot 28 during the EDM process. In accordance with the present invention, a plurality of the abutting electrodes 36 may be used in a modular or building block approach to forming high section aspect ratio slots 28. The individual electrodes 36 may take any suitable form and be formed of conventional material, such as brass, for forming the basic building block electrode 36.

As shown in FIG. 1, the abutting electrodes 36 are preferably equal in length L and are suitably larger than the depth D of the slots 28 to be formed thereby. As shown in FIG. 3, each of the exemplary electrodes 36 has a lateral width W and height h, with the several electrodes 36 being laterally aligned along a common lateral centerline axis 38 of the assembly to define a collective height H which is equal to the sum of the individual electrode heights h. The electrodes 36 abut together at corresponding flat sides 36a, which in FIG. 3 are the top and bottom sides of the middle electrode 36 and the bottom and top sides of the corresponding top and bottom electrodes 36. In the preferred embodiment illustrated in FIG. 3, at least two and preferably all three of the electrodes 36 are substantially identical to each other with each having a rectangular configuration in section which is preferably square in the exemplary embodiment.

Although at least two of the electrodes 36 may abut each other, preferably three electrodes 36 abut each other for obtaining a relatively high section aspect ratio of H/W. Identical electrodes 36 decrease the cost of making the individual electrodes 36 since they may be repetitively made using a common manufacturing process. The top and bottom end electrodes 36 are stacked with the middle electrode 36 to form a linear stacked assembly thereof. Since each electrode 36 is square, the individual height h is equal to the individual width W, and the collective height H is equal to 3h for effecting a section aspect ratio H/W of 3.0. The section aspect ratio therefore may be increased in integer values by simply stacking two or more of the individual electrodes 36 together. This has substantial benefits in both manufacturing of the individual electrodes 36 themselves, and in performing electrical discharge machining of the slots 28.

More specifically, FIG. 3 illustrates in phantom line an initially circular tube 40 which may be conventionally flattened in perpendicular directions to form the resulting tubular square electrode 36. Each electrode 36 therefore has a center passage 42 through which a conventional insulating liquid or dielectric fluid 44 may be conventionally channeled for flushing away debris during the EDM machining of the slots 28 as shown schematically in FIG. 1. The square flushing electrodes 36 therefore enjoy the advantage of economy of manufacture as well as the inherent strength and stability of geometry for use in EDM machining. In the exemplary embodiment illustrated in FIG. 1, the electrodes 36 are suitably joined to the multi-axis machine 32 which translates the electrodes 36 at the proper entry or inclination angle A toward the first sidewall 22 of the airfoil 12.

As the electrodes 36 are advanced during the EDM machining operation, the dielectric fluid 44 flows through each of the center passages 42 thereof. In this way, electrical discharge machining simultaneously forms a plurality of laterally abutting holes 28a, 28b, and 28c in the first sidewall 22 to collectively form the individual slots 28. The abutting holes 28a–c collectively define the resulting EDM slot having the slot height $H_S$ which is greater than the slot width $W_S$. The corresponding collective height H of the electrodes 36 is illustrated in FIG. 3 and the corresponding widths W thereof are suitably smaller than the slot height $H_S$ and slot width $W_S$ for providing the required channel therebetween for flow of the dielectric fluid 44 during electrical discharge machining.

As shown in FIG. 1, the electrode tool 34 may include a suitable number of the vertically spaced apart abutting electrode groups 36 which define the respective fingers thereof forming the corresponding slots 28. Each of the individual electrodes 36 has an inlet and is suitably joined in flow communication with a manifold 46 which is suitably joined to the multi-axis machine 32 for moving the manifold 40 and electrodes 36 joined thereto. The manifold 46 itself includes a suitable inlet joined in flow communication with a conventional supply of the dielectric fluid 44. Each center passage 42 of the electrodes 36 extends from the manifold 46 to the distal ends of the electrodes 36 from which is discharged the fluid 44 during EDM operation.

Suitable spacer blocks 48 are provided between the adjacent groups of the electrodes 36 to define the corresponding electrode fingers, and suitable clamps 50 are provided for clamping together the entire assembly of the electrode groups and spacer blocks 48 therebetween. The clamps 50 may take the form of simple endplates at opposite ends of the manifold 46 which may have suitable threaded fasteners effective for clamping together the individual electrodes 36 in the respective groups thereof in an abutting friction joint without the need for any adhesive therebetween.

Also shown in FIG. 1 is a suitable guide 52 fixedly joined to a stationary portion of the multi-axis machine 32 for example which supports the electrodes 36 as they are translated into the first sidewall 22 during machining. The electrodes 36 are cantilevered at their inlet ends from the manifold 46, with the guide 52 providing additional support closely adjacent to the airfoil 12 as the electrodes 36 are advanced theretoward during operation. The guide 52 may take the form of a simple plate with corresponding apertures therein and ensures that the abutting electrodes 36 maintain abutting contact with each other and the desired rectangular configuration thereof.

Since the individual electrodes 36 are preferably formed by the inexpensive process of collapsing the wall of round tubing, the resulting four corners of each square electrode 36 have a residual radius. The abutting electrodes 36 will therefore define a generally V-shaped recess therebetween which will form a corresponding cusp in the resulting EDM slots 28 as illustrated in FIG. 1. The machined cusps may remain if aerodynamically acceptable, or may be removed in a subsequent operation if desired. To minimize the extent of the remaining cusp, the resulting corner radii of the individual electrodes 36 should be made as small as possible. However, it is also desirable that the radii at the opposite two ends of the end electrodes 36 are relatively large for reducing stress concentrations in the resultant slots 28.

An improved configuration of the slot 28 may be obtained by suitably modifying the configurations of the individual electrodes 36 as shown in another embodiment in FIG. 4. In this embodiment, the middle electrode designated 36m is again a center passage flushing electrode which is rectangular with a width W and a height equal to half the width W/2. In this embodiment again, the two end electrodes designated 36e are substantially identical to each other but instead of being rectangular or square, they are generally D-shaped in section with each having an abutting flat side 36a, like in the FIG. 3 embodiment, which abut the middle electrode 36m, and two additional flat sides disposed perpendicularly thereto, with a semicircular arcuate side extending therebetween. All three electrodes 36m,e are again symmetrically aligned with each other about the lateral centerline axis 38 thereof, with the arcuate sides thereof facing outwardly away from the middle electrode 36m.

In this way, the arcuate sides of the end electrodes 36e will create corresponding arcuate portions of the resulting slots 28 in the first sidewall 22 for reducing stress concentration thereat. The electrodes 36m,e illustrated in FIG. 4 are also hollow and tubular, with each including a respective center passage 42 of corresponding configuration for carrying the dielectric fluid 44 into the slot 28 being machined in the first sidewall 22. Also in this embodiment, the abutting electrodes 36m,e may be suitably adhesively bonded together to fixedly join together the abutting sides 36a of the electrodes. The adhesive bond is made using a suitable electrically conductive adhesive 54, such as commercially available Eastman 910, which maintains the electrical continuity of the abutting electrodes, while also ensuring that the overall configuration thereof is accurately maintained.

FIG. 4 illustrates that the individual electrodes 36 may take any suitable form to generate the building blocks which collectively define the overall configuration thereof and a corresponding overall configuration of the resulting slot 28 formed by the electrical discharge machining process. Each individual electrode 36 is relatively stiff in both principal axes, with the corresponding square electrodes 36 of FIG. 3 being greater in stiffness than an analogous circular electrode. When identical electrodes 36 are used, the section aspect ratio may be increased in integer multiples by simply stacking together the individual electrodes 36. Identical electrodes 36 decrease the cost and turnaround time for manufacturing the electrodes since slot geometry is simply built up from single, inexpensive, standard electrodes 36 which define the building blocks.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

What I claim is:

1. An electrode assembly for electrical discharge machining a slot in a wall comprising a plurality of laterally abutting individual electrodes having a collective perimeter configuration complementary with said slot wherein the individual electrodes abut at flat sides which correspond substantially to a width of the slot, wherein abutting electrodes are in electrical continuity, and wherein each of said electrodes is tubular and includes a center passage for carrying a dielectric fluid into said slot being machined in said wall.

2. An assembly according to claim 1 wherein each of said electrodes has a lateral width and a height, and said electrodes are laterally aligned to define a collective height equal to the sum of said individual electrode heights.

3. An assembly according to claim 2 wherein at lest one of said electrodes has a rectangular configuration.

4. An assembly according to claim 3 wherein said rectangular configuration is square.

5. An assembly according to claim 3 further comprising three of said electrodes, with a middle electrode being rectangular and abutting two end electrodes on opposite sides thereof.

6. An assembly according to claim 5, wherein at least two of said electrodes are substantially identical.

7. An assembly according to claim 6 wherein said two end electrodes are substantially identical.

8. An assembly according to claim 7 further comprising means for clamping together said electrodes.

9. An assembly according to claim 7 wherein said two end electrodes are rectangular.

10. An assembly according to claim 9 wherein all of said electrodes are rectangular and said collective perimeter configuration is rectangular.

11. An assembly according to claim 10 wherein all of said electrodes are substantially square.

12. An electrode assembly for electrical discharge machining a slot in a wall, the electrode assembly comprising three laterally abutting individual electrodes having a collective perimeter configuration complementary with said slot; and means for bonding together said electrodes such that abutting electrodes are in electrical continuity;

wherein each of said electrodes has a lateral width and a height, and said electrodes are laterally aligned to define a collective height equal to the sum of said individual electrode heights; and wherein the electrodes abut at flat sides which correspond substantially to the lateral width of the slot, with a middle electrode being rectangular and abutting two substantially identical end electrodes on opposite sides thereof.

13. An assembly according to claim 12, wherein said bonding means comprise an adhesive fixedly joining together said abutting sides of said electrodes.

14. A method of electrical discharge machining a slot in a wall comprising:

simultaneously electrical discharge machining a plurality of laterally abutting holes into said wall to form said slot; and center flushing a dielectric fluid through each of said abutting holes during machining;

wherein the plurality of laterally abutting holes are machined with a plurality of laterally abutting individual electrodes which abut at flat sides which correspond substantially to a slot width, the laterally abutting individual electrodes being in electrical continuity with each other; and wherein said abutting holes collectively define said slot having a slot height greater than the slot width.

15. A method according to claim 14, wherein said abutting holes collectively define a rectangular slot.

16. An electrode assembly for electrical discharge machining a slot in a wall comprising a plurality of laterally abutting individual electrodes having a collective perimeter configuration complementary with said slot wherein the individual electrodes abut at flat sides which correspond substantially to a width of the slot;

wherein a ratio of a length of the individual electrodes to a width of the individual electrodes is greater than or equal to about 50.

17. A method of electrical discharge machining a slot in a wall comprising:

simultaneously electrical discharge machining a plurality of laterally abutting holes into said wall to form said slot; and machining the plurality of laterally abutting holes such that a depth of the slot is greater than or equal to about 50 times the slot width;

wherein the plurality of laterally abutting holes are machined with a plurality of laterally abutted individual electrodes which abut at flat sides which correspond substantially to a slot width; and wherein said abutting holes collectively define said slot having a slot height greater than the slot width.

* * * * *